A. W. ARNETT.
EDUCATIONAL APPLIANCE.
APPLICATION FILED MAR. 17, 1911.
1,013,856.
Patented Jan. 9, 1912.
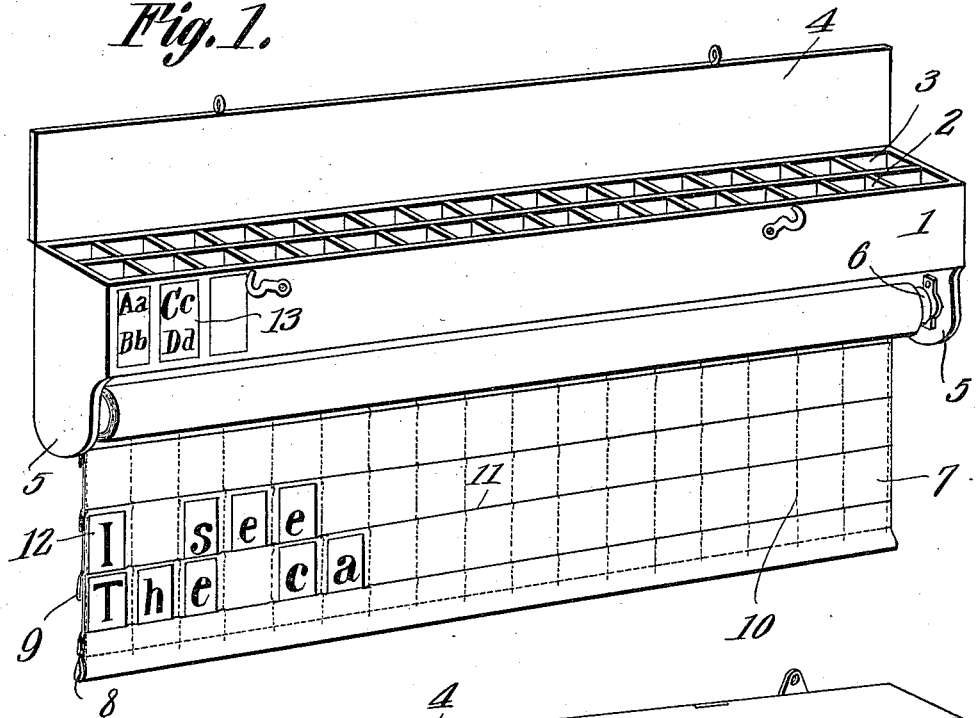
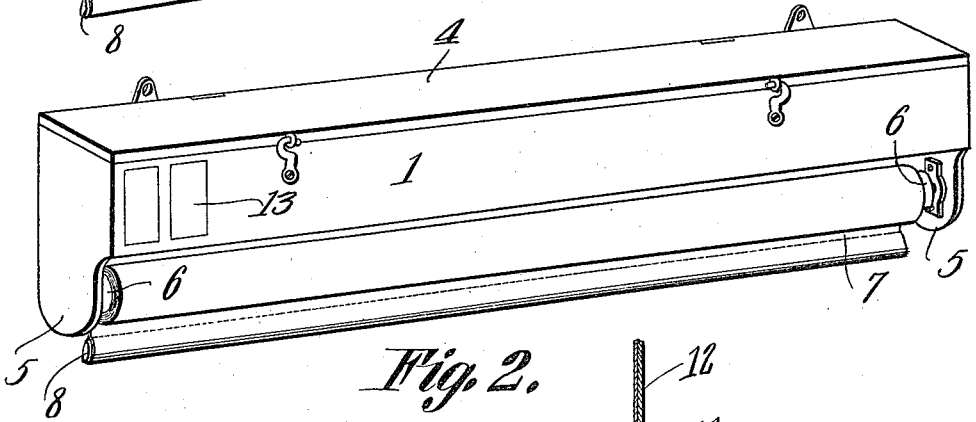
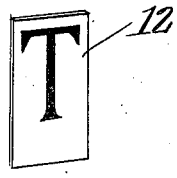
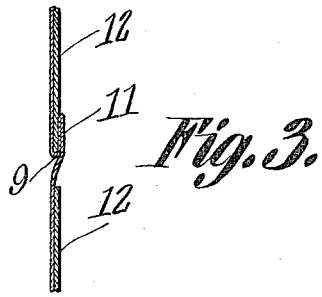
Anna W. Arnett
Inventor,
by C. A. Snow & Co.
Attorneys.
Witnesses

UNITED STATES PATENT OFFICE.

ANNA W. ARNETT, OF LAWRENCE, KANSAS.

EDUCATIONAL APPLIANCE.

1,013,856. Specification of Letters Patent. Patented Jan. 9, 1912.

Application filed March 17, 1911. Serial No. 615,099.

*To all whom it may concern:*

Be it known that I, ANNA W. ARNETT, a citizen of the United States, residing at Lawrence, in the county of Douglas and State of Kansas, have invented a new and useful Educational Appliance, of which the following is a specification.

This invention relates to educational appliances and more particularly to means adapted to be used to facilitate the teaching and learning of reading, spelling, language construction, number work and the like, its object being to provide an inexpensive, simple and compact structure by means of which pupils or other persons are enabled not only to recognize characters, but to assemble them in a predetermined relation.

A further object is to provide a structure of this character which, when not in use, can be stored in a small space.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawings:—Figure 1 is a perspective view of a device constructed in accordance with the present invention, the flexible rack being shown partly extended and supporting members having characters thereon. Fig. 2 is a perspective view showing the apparatus closed, as when not in use. Fig. 3 is an enlarged section through a portion of the rack and showing a detachable member mounted therein. Fig. 4 is a perspective view of one of said members.

Referring to the figures by characters of reference, 1 designates a box-like receptacle subdivided, by means of partitions 2 into a suitable number of compartments or pigeon holes 3, these compartments being adapted to be closed by means of a cover 4 mounted in any suitable manner. The receptacle 1 may be attached in any manner desired to a supporting structure and has, in the form of the device illustrated, depending ears 5 for engaging and supporting the trunnions of a roller 6 such as commonly employed in connection with window shades. Secured to this roller and hanging therefrom is a strip 7 of flexible material reinforced along its lower edge by means of a strip 8 of wood or the like. This strip 7 has transverse plaits or folds 9 and parallel rows of stitches such as indicated at 10 extend across these folds or plaits so as to form transversely extending parallel series of pockets 11 any one of which is designed to receive a card, slip, plate or any other member 12 on which a character is printed or otherwise displayed.

In using the device it is intended to have all of the compartments 3 supplied with character bearing members 12, one compartment being provided for each kind of character employed. Labels, such as indicated at 13, may be affixed in any desired manner to the front face of the receptacle 1 so as to indicate the contents of the compartment designated by the label. By unwinding the flexible rack 7 from the roller 6, one or more series of pockets may be exposed and into these pockets any of the members 12 may be inserted in any predetermined relation. The pockets are of such depth as to receive only the lower end portions of the members 12, thus exposing those portions of the members on which the characters appear.

It has been found that, by using an appliance such as described, greater interest has been added to the work inasmuch as the pupil or other person using the appliance derives more pleasure from the act of actually constructing combinations of characters after properly recognizing them, than merely from the recognition of the characters.

What is claimed is:—

1. A device of the class described including a roll, a flexible strip adapted to be wound thereon, and a plurality of separate flexible pockets upon the strip and adapted to be wound therewith upon the roll.

2. A device of the class described including a roll, a flexible element adapted to be wound thereon, and parallel series of separate pockets of flexible material upon said element and adapted to be wound therewith upon the roll.

3. A device of the class described including a flexible strip adapted to be wound, and flexible pockets upon the strip and adapted to be wound therewith.

4. A device of the class described including a flexible strip adapted to be wound, and parallel series of flexible pockets upon the strip and adapted to be wound therewith.

5. A device of the class described including a strip having plaits extending transversely thereof, and means for dividing the spaces back of the plaits into separate pockets.

6. A device of the class described including a flexible element folded to form plaits upon one face thereof and means for securing the plaits to said element at intervals to form separate pockets between the element and each plait.

7. A device of the class described including a flexible element folded to form parallel plaits upon one face, and parallel rows of stitches extending transversely of the plaits and forming parallel rows of pockets between the plaits and said element.

8. A device of the class described including a flexible element, a plurality of separate flexible pockets upon said element, and means for rolling the element and pockets.

9. A device of the class described including a receptacle, members having characters thereon and adapted to be stored within the receptacle, a flexible rack having flexible pockets therein, said members being insertible in any predetermined relation into the pockets, and means for rolling the rack to close and conceal the pockets.

10. An educational appliance including a flexible element folded transversely to form plaits extending upwardly upon the front face of said element, and flexible means extending transversely of the plaits for dividing each plait into non-communicating pockets.

11. An educational appliance including a flexible element having transverse folds forming plaits extending upwardly along the front face of said element, and flexible means extending across the plaits at the ends thereof and at intermediate points for dividing the plaits into separate pockets.

In testimony that I claim the foregoing as my own, I have hereto affixed my signature in the presence of two witnesses.

ANNA W. ARNETT.

Witnesses:
HUGH BLAIR,
JENNIE WATT.

---

Copies of this patent may be obtained for five cents each, by addressing the "Commissioner of Patents, Washington, D. C."